United States Patent
Indeck

[19]

[11] Patent Number: 6,072,669
[45] Date of Patent: Jun. 6, 2000

[54] THIN FILM MAGNETIC WRITE HEAD WITH PRECONDITIONING GAP

[76] Inventor: Ronald S. Indeck, 729 Gralee La., Olivette, Mo. 63132

[21] Appl. No.: 08/822,778

[22] Filed: Mar. 21, 1997

[51] Int. Cl.[7] .................................................. G11B 5/265
[52] U.S. Cl. ........................... 360/121; 360/123; 360/126
[58] Field of Search .................................... 360/110, 119, 360/120, 121, 122, 123, 125

[56] References Cited

U.S. PATENT DOCUMENTS

| | | | |
|---|---|---|---|
| 4,672,493 | 6/1987 | Schews | 360/125 |
| 4,825,318 | 4/1989 | Hoo et al. | 360/121 |
| 4,908,724 | 3/1990 | Jeffers | 360/123 |
| 4,979,051 | 12/1990 | Eggebeen | 360/121 X |
| 4,979,064 | 12/1990 | Mage et al. | 360/125 |
| 5,315,469 | 5/1994 | McNeil | 360/119 |

FOREIGN PATENT DOCUMENTS

| | | | |
|---|---|---|---|
| 0 166 890 | 1/1986 | European Pat. Off. | 360/121 |
| 52-20810 | 2/1977 | Japan | 360/121 |
| 56-29878 | 3/1981 | Japan | 360/121 |
| 56-80817 | 7/1981 | Japan | 360/121 |
| 57-105820 | 7/1982 | Japan | 360/121 |
| 57-179931 | 11/1982 | Japan | 360/121 |
| 3-178059 | 8/1991 | Japan | 360/121 |
| 287125 | 1/1971 | U.S.S.R. | 360/121 |

OTHER PUBLICATIONS

"High Resolution Magnetic Recording Head", Schlaeppi, IBM TDB, vol. 6, No. 2 p. 68, Jul. 1963.

"Multigap Recording Head", Thompson, IBM TDB, vol. 12, No. 10, p. 1555, Mar. 1970.

*Primary Examiner*—William Klimowicz

[57] ABSTRACT

A thin film magnetic head includes an integrally formed preconditioning gap having a width greater than the write gap width to precondition a magnetic media for the more accurate placement of magnetic transitions on a magnetic medium. The thin film magnetic head is comprised of a first extended pole piece underlying a thin pancake helically wound magnetic coil with a second pole piece aligned with the first pole piece and attached to it through the center of the coil. A third pole piece, aligned with the first two pole pieces, overlies all of the foregoing and is attached to the first pole piece at its rearward end to thereby cover the other underlying layers of this thin film structure. The single magnetic coil surrounds the second pole piece and energizes both gaps.

24 Claims, 3 Drawing Sheets

THIN FILM MAGNETIC WRITE HEAD WITH PRECONDITIONING GAP

BACKGROUND AND SUMMARY

At present, most digital magnetic recording systems, such as those used for hard disk drives for personal computers, do not erase previously recorded data before recording new data. This is commonly known as recording in a direct overwrite mode. However, it has been found that writing in a direct overwrite mode increases the uncertainty of the exact location where a magnetic transition has been placed corresponding to the new data. This uncertainty reduces the system's signal-to-noise ratio (SNR) which has the practical limitation of reducing the system's effective storage capacity. As the bit lengths in digital recording become shorter from their already submicrometer dimensions, the ability of existing systems to write sharp transitions at particular locations lessens due to the previously written data encountered in the direct overwrite mode. As a result, signal degradation in the form of signal amplitude reduction, output pulse shape broadening, and pulse position shifts are experienced. This continuing progress in reducing the size of bit lengths and track dimensions require even more accurate recording of sharp transitions to achieve digital data density resulting in improved performance. Therefore, erasing previously recorded magnetic information would be desirable in any digital magnetic recording system, but practical implementation of this erase operation remains elusive for many applications. For example, consider the tracks in rigid disk systems. These tracks are narrow, nearing the micrometer width, are separated by distances smaller than even the track width's micrometer dimension, and these track dimensions are rapidly shrinking with each new product iteration seeking greater data density. In these applications, erasing previously recorded data before writing with conventional magnetic recording heads might be thought of in a couple of ways. One such way is for the read/write head to erase the portion (sector) of the track to be recorded on one pass of the head, and then the next pass of the head would be used to record new digital data on the previously erased sector. An obvious drawback with this approach is that it would require a time consuming extra revolution for all write steps. This delay, presently 16 milliseconds for a 3600 rpm disk drive, is larger than any other single delay for the system and would degrade overall data transfer performance. Another approach could include providing a separate erase head physically positioned "upstream" of the conventional write head, and displaced in position as with other prior art video or audio erase heads. In analog audio or video tape recording, an erase step is used to precondition the medium by erasing the old information with a separate erase head. In these systems, the erase head is physically distinct and separated from the recording head spatially and in design. The erase head may be displaced from the record head by several centimeters; may erase multiple tracks of old information in the same pass; may have a large magnetic gap for deep penetration of the magnetic field into the medium; and may use a single DC or AC applied current to erase the medium. However, there are problems in utilizing this approach with digital magnetic recording systems including the problem of physically aligning the two heads with respect to each other and with respect to the track to be overwritten. At present data densities and track dimensions, this is at least difficult and perhaps overwhelmingly challenging with track pitches projected to be 100 nanometers or less, especially considering that the heads must be consistently aligned over time, with temperature and other mechanical deviations providing further complications. Still another approach would include fabricating a second head to perform the erase function directly over the conventional write head. This approach could be considered in thin film heads which are widely used for digital magnetic recording systems. However, there would be significant cost and complexity added to the manufacturing process due to the additional steps involved with this approach.

To solve these and other problems in the prior art, the inventor has succeeded in developing a design for a thin film head with an integrated preconditioning gap which may be constructed with only a slight modification to the present manufacturing techniques utilized to construct thin film recording heads. It is anticipated that this modified construction may be achieved with only a small processing cost and without significantly reducing the expected yield of the delicate thin film manufacturing process. In essence, the inventors' design utilizes the same layering of a first magnetic pole piece, a pancake magnetic coil, and a second magnetic pole piece magnetically coupled to the first pole piece with one set of edges being spaced to form the magnetic gap therebetween. However, the bottom or first pole piece would have an extended length so as to underlie the entirety of the pancake coil, and a third pole piece is provided which magnetically couples to the extended tail of the bottom or first pole piece to thereby encircle the back half windings of the pancake coil. The second gap or preconditioning gap is thereby formed between this additional third pole piece and the second pole piece.

In sum, using conventional thin film manufacturing techniques and present designs, a thin film magnetic recording head may be conveniently manufactured with an intricately formed preconditioning gap to provide an on-the-fly erase function. This device has applicability to both perpendicular and longitudinal recording. Due to its being manufactured in an integral, single head, the preconditioning gap is always aligned with the write gap and suffers the same environmentally induced degradation such as through temperature, stress, or the like such that it remains so. Furthermore, there is no intervening spacing between the preconditioning gap and the write head as the center pole piece forms part of the magnetic circuit for each of these two gaps. Therefore, once manufactured, the preconditioning gap is aligned, its performance may be measured and tested to verify its operating parameters, and could be expected to remain in that condition over time and through its useful life. As the center pole piece is energized by a single coil, and the center pole piece forms part of the magnetic circuit for both gaps, there is no requirement for a second magnetic coil. This reduces cost, manufacturing complexity, eliminates alignment problems, and contributes to the invention's elegantly simple design. Furthermore, there is no need for a separate "erase" signal as the write signal which energizes the coil is used.

This same concept may also be implemented in a ring head coil construction with a center pole comprising an I-pole piece having a coil wrapped therearound and two C-pole pieces surrounding the I-pole piece.

While the principal advantages and features of the present invention have been explained, a fuller understanding of the invention may be gained by referring to the drawings and description of the preferred embodiment.

DESCRIPTION OF THE PREFERRED EMBODIMENT

Figure 1:
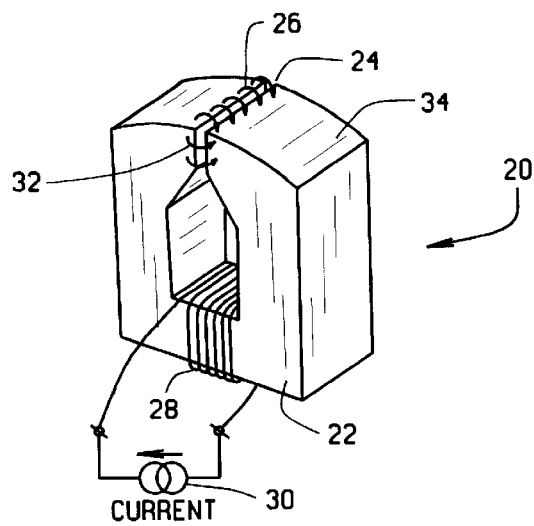
FIG. 1 is a schematic representation of a conventional inductive write head as known in the art.

As shown in FIG. 1, it is well known in the prior art that a conventional inductive write head 20 is formed with a head core 22 made of magnetic material and formed in the general shape of a C with a gap 24 wherein a gap fringing field 26 is formed through energization of a coil 28 energized from a current source 30, all as is well known in the art. Also, a side fringing field 32 is formed along the side edges of gap 24. The magnetic flux in the gap fringing field 26 is emitted during writing, or erasing, as coil 28 is energized to magnetize a magnetic medium (not shown) which passes across the face 34 of head core 22 and adjacent gap 24. The conventional head structure depicted in FIG. 1 has been dramatically improved on and miniaturized over the years since its discovery to present day techniques which include a new method of fabrication known as thin film.

Figure 2A:
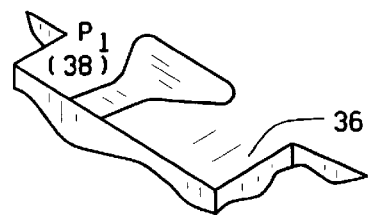
FIGS. 2(a) to (d) are perspectives detailing the construction of a thin film inductive head or write head manufactured through layering processes as known in the art.
Figure 2B:
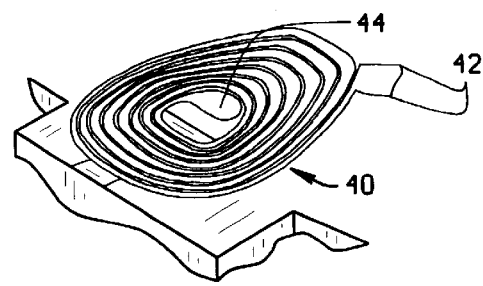
Figure 2D:
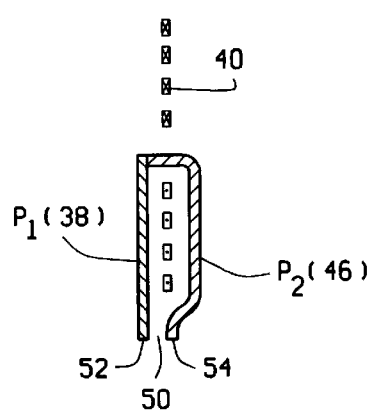
Figure 2C:
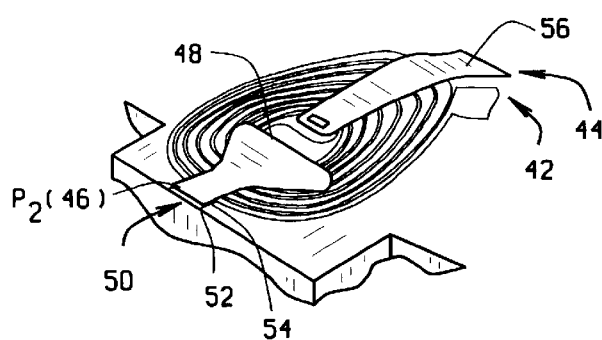

Thin film head construction is depicted in FIGS. 2(a)–(d). In this method of construction, a substrate 36 forms a base over which a first pole piece $P_1$ (38) comprised of a thin film of magnetic material is laid. Over pole piece $P_1$, a thin pancake coil 40 is laid wound in a spiral with its leads 42, 44 for electrical connection to an appropriate current source (not shown). As shown in FIG. 2(c), a second pole piece $P_2$ (46) overlies one side of the windings comprising coil 40 with a connector 48 attaching pole piece $P_2$ to pole piece $P_1$ in an appropriate mechanical orientation to form gap 50 therebetween at the tips 52, 54 of pole pieces $P_1$, $P_2$, respectively. A lead connector 56 is also applied to provide a convenient means for connecting the interior coil lead 44 to an external current source (not shown). As shown in FIG. 2(d), the windings of coil 40 surround pole piece $P_2$ to induce a magnetic flux in the gap 50 formed between pole tips 52, 54.

Figure 3A:
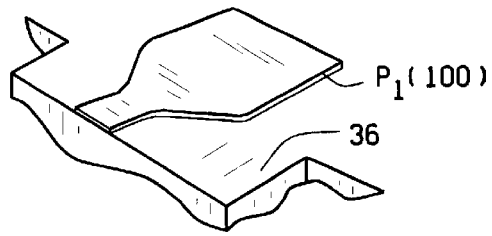
FIGS. 3(a)–(d) are perspective views detailing the construction of the thin film inductive head of the present invention.
Figure 3B:
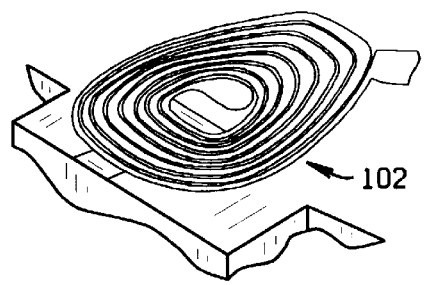
Figure 3D:
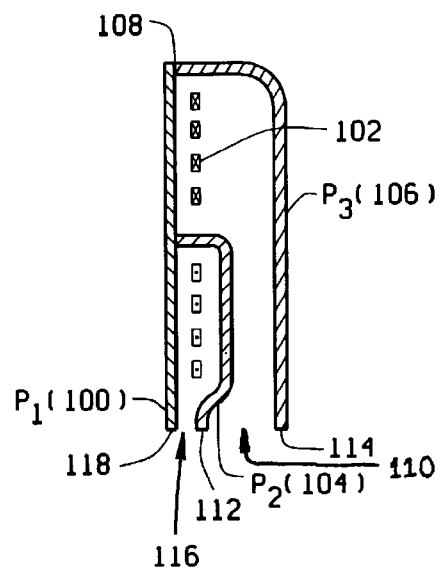
Figure 3C:
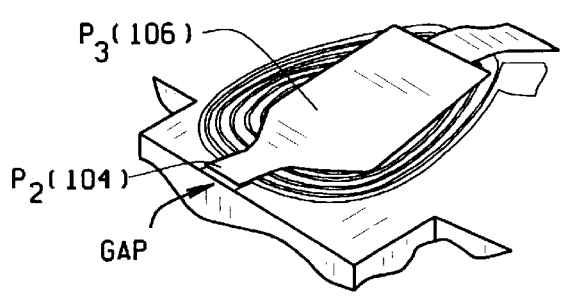

The present invention builds on the prior art construction of thin film magnetic heads and is depicted in FIGS. 3(a)–(d). As shown in FIG. 3(a), a pole piece $P_1$ (100) is provided which extends for a greater distance along substrate 36 so as to underlie coil 102 and extend beyond the outer edges of its back winding. This is depicted in FIG. 3(b) with coil 102 covering substantially the entirety of pole piece $P_1$ (100). As shown in FIGS. 3(c) and (d), pole piece $P_2$ (104), similar to the prior art construction shown in FIG. 2, overlies the front of coil 102 and is connected to pole piece $P_1$ (100) at the center of the coil 102. However, a third pole piece, $P_3$ (106) overlies pole piece $P_2$ (104) and the back half of coil 102 where it is magnetically coupled to pole piece $P_1$ at its rear most end 108. As perhaps is best shown in FIG. 3(d), coil 102 thereby surrounds pole piece $P_2$ (104), similar to the prior art construction shown in FIG. 2, however, a second magnetic circuit is formed between pole piece $P_2$ (104), the back half of pole piece $P_1$ (100) which is joined at junction 108 to pole piece $P_3$ (106) to thereby form a preconditioning gap 110 between the tip 112 of pole piece $P_2$ (104) and the tip 114 of pole piece $P_3$ (106). This second, preconditioning gap 110, is in addition to the write gap 116 formed between the tip 112 of pole piece $P_2$ (104) and the tip 118 of pole piece $P_1$ (100).

In the present invention, the preconditioning gap 110 serves to precondition or magnetize into a known state, the magnetic medium prior to its presentation to the write gap 116. As this magnetization is induced by the preconditioning gap 110 is well known, and is directly related to the write field as it is being driven by the same write current, much more precise placement of the transition onto the medium may be achieved. This will provide a significant improvement in the SNR and accommodate an increase in the system capacity by increasing data density. Although the dimensions for write gap 116 and preconditioning gap 110 may be selected as desired to accommodate any particular application, the inventor contemplates that a write gap of between about 0.15 and about 0.25 microns is presently considered typical, and these dimensions are decreasing as development continues such that a write gap of 0.10 microns is expected soon. Similarly, the preconditioning gap 110 width may be chosen as desired but the inventor contemplates that a width of approximately 0.5 microns or less will provide the preconditioning effect as desired for preconditioning the magnetic medium. Similarly, the pole tip width of each pole piece may be chosen to provide appropriately sized erase and write tracks, depending upon the particular application. One such configuration might include a preselected pole tip width for $P_1$, a wider pole tip width for $P_2$, and a pole tip width of $P_3$ the same as that of $P_1$. This arrangement would provide a larger erase track width to overcome the potential problem of not completely erasing old information due to improper head alignment. Although, it would not be uncommon for the pole tip widths to be equal to provide erase and write track widths of comparable width. As is known in the art, the pole tips may be sized by planar lithography, pole tip trimming, or some other equivalent method.

In operation, a magnetic medium (not shown) would traverse the head construction of the present invention as depicted in FIG. 3(d) from right to left such that it would first be subjected to the magnetic field induced by preconditioning gap 110 to precondition it. As that portion of the magnetic medium passes under write gap 116, its induced magnetization is known as it has been preconditioned or magnetically "written to" by preconditioning gap 110. Although, as mentioned above, the gap size for preconditioning gap 110 may be chosen as desired, it is presently thought that A-C erasure is more desired. Hence, a wider preconditioning gap 110 with a higher frequency data write signal will provide a decaying alternating field that will set the state of magnetization on the magnetic medium closer to that expected to be achieved with true A-C erasure. This is due in part to a wider gap not being as effective in creating a sharp transition. However, this is just one example of a particular construction which may be utilized, depending upon the particular application chosen.

There may also be manufacturing considerations which would impact on the choice of individual pole piece construction or gap sizing. For example, as depicted in FIG. 3(d) and explained herein, pole piece $P_1$ (100) has been chosen to extend under the full width of coil 102, with pole piece $P_2$ (104) attached near its center or medial portion, and pole piece $P_3$ (106) attached near its end opposite the tip end. However, other alternative construction could be used and still satisfy the magnetic requirements of the head of the present invention. For example, pole piece $P_2$ may be chosen to include the extension underlying the back half of coil 102. Or, P₃ (106) may also be chosen to include that portion of a pole piece which underlies the back half of coil 102. Similarly, other configurations may be utilized to satisfy the coil requirements for the head of the present invention. For example, a separate or additional coil may be utilized which might, for example, surround pole piece P₃ to provide a different preconditioning signal than the write signal.

Figure 4:
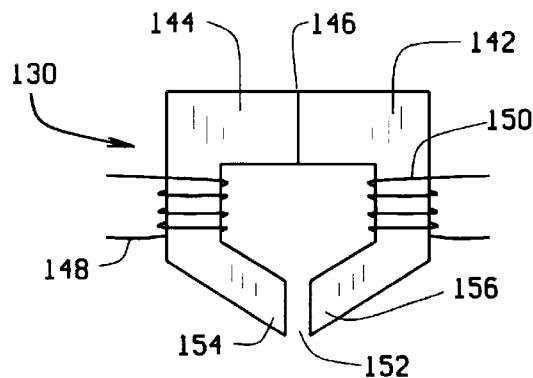
FIG. 4 is a schematic representation of the prior art construction of a ring head coil detailing the use of two C pole pieces.
Figure 5:
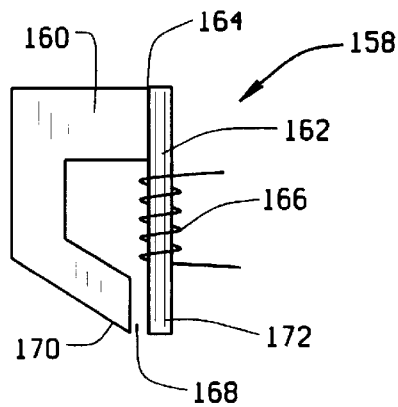
FIG. 5 is a schematic representation of a prior art ring head coil utilizing a C and I pole piece.

As shown in FIG. 4, the construction of a prior art ring head coil 140 may include a pair of C-shaped pole pieces 142, 144 joined by suitable means as known in the art at one end thereof, as shown at 146. One or more coils 148, 150 may be wrapped around the C-shaped pole pieces 142, 144 in order to energize a write or read gap 152 between the opposite ends 154, 156 of C-shaped pole pieces 142, 144. An alternative construction for a ring head coil 158 includes a C-shaped pole piece 160 and an I-shaped pole piece 162 joined at an end thereof as at 164 with a coil 166 wrapped around the I-shaped pole piece 162. In this construction, a read or write gap 168 is formed between the opposite ends 170, 172 of the two pole pieces 160, 162. This construction might be in some circumstances easier to manufacture as the coil 166 may be readily wrapped around the I-shaped pole piece 162 prior to its being joined as at joint 164 using convenient manufacturing methods, as known in the art.

Figure 6:
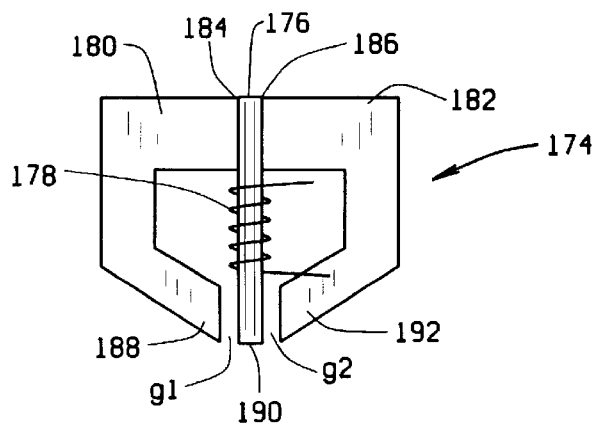
FIG. 6 is a schematic representation of a ring head coil arrangement illustrating a write head with preconditioning gap of the present invention.

The present invention may be implemented in the ring head coil 174 in a construction as depicted in FIG. 6. In that construction, a center I-shaped pole piece 176 having a coil 178 wrapped therearound is surrounded on either side by a C-shaped pole piece 180, and a C-shaped pole piece 182, both of which are joined at an end to the I-shaped pole piece 166 at joints 184, 186. A write gap $g_1$ is formed between the ends 188 of C-shaped pole piece 180 and end 190 of I-shaped pole piece 176. A preconditioning gap $g_2$ is formed between the end 192 of C-shaped pole piece 182 and end 190 of I-shaped pole piece 176. In ring coils, write gaps may be somewhat larger than those in presently manufactured thin film heads. For example, write head gap $g_1$ may be of a size of approximately 0.2 microns up to 0.5 microns, and even larger depending upon the particular application such as for video tape, etc. For purposes of the present invention, it is only important that the width of preconditioning gap $g_2$ be chosen as is sufficient to precondition the magnetic medium prior to its being written on with write gap $g_1$. In the preferred embodiment, the inventor contemplates that the preconditioning gap $g_2$ is larger than the write gap $g_1$.

Still another aspect of the present invention is the improvement in the head field gradient, and the ability of the manufacturer to alter and adjust the head field gradient by adjusting the gap widths. As shown by the inventors' prior work, the head field gradient may be sharpened to facilitate the writing of sharp transitions on a magnetic medium by locating a shim in an existing write gap. However, until the present invention, a physical embodiment or construction to implement a shim placement has not been known. With the present invention, an integral construction is provided which lends itself readily to location of the center pole piece and its use as part of both the write gap and preconditioning gap for achieving an improved or sharpened head field gradient. This sharpened head field gradient also renders the head more suitable for perpendicular recording for which sharp transitions are especially important.

Still other variations in construction may be considered and implemented by those skilled in the art in order to facilitate manufacture, or for other reasons, and yet not depart from the spirit and scope of the invention. The present invention shall not be considered to be limited to the construction of the preferred embodiment as has been previously described and instead should be limited only by the scope of the claims appended hereto, and their equivalents.

What is claimed is:

1. A thin film magnetic recording head having a pair of gaps formed between three pole pieces, said gaps being substantially aligned to successively traverse the same portion of a recording medium as the head is moved thereacross, the center pole piece having a planar thin film coil wrapped therearound for magnetically energizing each of said gaps simultaneously, said planar thin film coil being disposed in a substantially singular plane, said plane being substantially perpendicular to a head surface that faces said recording medium during recording, whereby said portion of the recording medium can be preconditioned by one of said gaps before the other of said gaps is moved across said preconditioned portion.

2. The thin film magnetic recording head of claim 1 wherein said pair of gaps comprises a write gap and a preconditioning gap, said preconditioning gap being wider than said write gap.

3. The thin film magnetic recording head of claim 2 wherein said gaps are formed between a pole tip of each of said pole pieces, said pole tips having a preselected width, as desired.

4. The thin film magnetic recording head of claim 2 wherein said pole pieces overlie each other and the coil in an integrated thin film structure.

5. The thin film magnetic recording head of claim 4 wherein said structure includes a first pole piece $P_1$, a substantially helically wound pancake coil overlying $P_1$, a second pole piece $P_2$ overlying a portion of said coil and magnetically coupled to $P_1$ at a medial position thereof through a center of said coil, and a third pole piece $P_3$ overlying $P_2$ and magnetically coupled to an end thereof.

6. The thin film magnetic recording head of claim 5 wherein $P_3$ is magnetically coupled to $P_2$ through a portion of $P_1$.

7. The thin film magnetic recording head of claim 5 wherein $P_3$ is magnetically coupled to $P_1$ at an end thereof to substantially surround $P_2$ and the coil between them.

8. In a thin film magnetic recording head having a planar thin film magnetic coil, a first pole piece $P_1$ substantially underlying a first half of said magnetic coil, and a second pole piece $P_2$ substantially overlying the first half of said magnetic coil, the pole pieces $P_1$ and $P_2$ together defining a write gap, the improvement comprising an extension of the pole piece $P_1$ which substantially underlies a second half of the magnetic coil, and a third pole piece $P_3$ that substantially overlies the second half of the magnetic coil and the pole piece $P_2$, the pole pieces $P_2$ and $P_3$ together defining a preconditioning gap, said preconditioning gap being substantially aligned with said write gap for traversing and preconditioning a portion of a recording medium before said write gap is moved across said preconditioned portion, said magnetic coil being capable of energizing both of said gaps simultaneously.

9. The improved thin film magnetic recording head of claim 8 wherein said coil is a substantially helically wound pancake magnetic coil.

10. The improved thin film magnetic recording head of claim 8 wherein the pole piece $P_3$ is magnetically coupled to the pole piece $P_2$ through a portion of the pole piece $P_1$.

11. A thin film magnetic recording head comprising first, second and third pole pieces having at least distal ends, said pole pieces substantially lying in first, second and third planes, respectively, the distal ends of said pole pieces together defining a pair of gaps, said gaps being aligned to successively traverse the same portion of a recording medium as the head is moved thereacross, and a magnetic coil simultaneously for energizing both of said gaps, said magnetic coil being comprised of a plurality of windings, said windings being substantially aligned to be successively adjacent one another so that substantially all of said windings lie in a single plane and extend around a portion of one of said pole pieces, whereby said portion of the recording medium can be preconditioned by one of said gaps before the other of said gaps is moved across said preconditioned portion.

12. The thin film magnetic recording head of claim 11 wherein the second pole piece is positioned between the first and third pole pieces.

13. The thin film magnetic recording head of claim 12 wherein the magnetic coil extends around a portion of the second pole piece.

14. The thin film magnetic recording head of claim 13 wherein the pair of gaps comprise a write gap and a preconditioning gap.

15. The thin film magnetic recording head of claim 14 wherein the second pole piece has an end thereof magnetically coupled to the first pole piece, and the third pole piece has an end thereof magnetically coupled to the second pole piece.

16. The thin film magnetic recording head of claim 15 wherein the third pole piece is magnetically coupled to the second pole piece through a portion of the first pole piece.

17. The thin film magnetic recording head of claim 16 wherein said coil is a thin film pancake coil.

18. The thin film magnetic recording head of claim 14 wherein said preconditioning gap is wider than said write gap.

19. The thin film magnetic recording head of claim 18 wherein the write gap is between about 0.10 microns and about 0.25 microns in width.

20. The thin film magnetic recording head of claim 19 wherein the preconditioning gap is approximately 0.5 micron in width.

21. A thin film magnetic recording head having a pair of gaps formed between three pole pieces, said pair of gaps being aligned with one another to successively traverse the same portion of a recording medium as the head is moved thereacross, said pole pieces including a center pole piece substantially lying in a single plane, said center pole piece having a single thin film coil wrapped around a portion thereof for magnetically energizing both of said gaps simultaneously, said thin film coil substantially lying in a single plane generally parallel to the plane of said center pole piece, whereby said portion of the recording medium can be preconditioned by one of said gaps before the other of said gaps is moved across said preconditioned portion.

22. The recording head of claim 21 wherein said pole pieces further include upper and lower pole pieces.

23. The recording head of claim 22 wherein the center pole piece overlies a portion of said coil and is magnetically coupled to the lower pole piece through a center of said coil.

24. The recording head of claim 23 wherein the upper pole piece is magnetically coupled to the center pole piece through a portion of the lower pole piece.

* * * * *